United States Patent [19]

Trunk

[11] Patent Number: 5,669,415
[45] Date of Patent: Sep. 23, 1997

[54] SHUT-OFF DEVICE OF THE DOUBLE BLOCK-AND-BLEED TYPE

[75] Inventor: Werner Trunk, Naestved, Denmark

[73] Assignee: Brdr. Christensens Haner A/S, Haslev, Denmark

[21] Appl. No.: 634,567

[22] Filed: Apr. 18, 1996

[30] Foreign Application Priority Data

Apr. 27, 1995 [DK] Denmark .................. 9500167

[51] Int. Cl.⁶ .................................................. F16K 5/08
[52] U.S. Cl. .................... 137/613; 137/625.32; 251/309
[58] Field of Search .......................... 137/613, 625.32, 137/860; 251/304, 309, 312

[56] References Cited

U.S. PATENT DOCUMENTS

| | | | |
|---|---|---|---|
| 611,899 | 10/1898 | Freeman | 137/625.32 |
| 911,546 | 2/1909 | Shields et al. | 137/625.32 |
| 1,130,399 | 3/1915 | Gustafson | 137/625.32 |
| 2,045,113 | 6/1936 | Ward | 251/312 X |
| 3,101,191 | 8/1963 | Wolfensperger | 251/309 |
| 4,658,847 | 4/1987 | McCrone | 251/315 X |
| 4,846,212 | 7/1989 | Scobie et al. | 137/613 X |
| 5,312,086 | 5/1994 | Hollingworth | 251/309 |

FOREIGN PATENT DOCUMENTS

| | | |
|---|---|---|
| 565243 | 10/1993 | European Pat. Off. . |
| 918020 | 2/1963 | United Kingdom . |
| 969440 | 9/1964 | United Kingdom . |
| 1541269 | 2/1979 | United Kingdom . |
| 2236829 | 4/1991 | United Kingdom . |
| 8400795 | 3/1984 | WIPO . |

*Primary Examiner*—Kevin Lee
*Attorney, Agent, or Firm*—Donald S. Dowden

[57] ABSTRACT

A shut-off device of the double block-and-bleed type comprising a flow passageway accommodating two shut-off members provided with through-going cavities, and a drain means. The flow passageway is provided with an inlet and an outlet. Each of the shut-off members may be moved between a position in which the flow passageway is open and a position in which the flow passageway is closed. In association with the shut-off members two auxiliary chambers are communicating with cavities of the shut-off members. The shut-off device is formed of a single undivided casing. The shut-off members are truncated cone-shaped and mounted in matching truncated cone-shaped recesses in the common casing. As a result, the overall length of the shut-off device may be reduced compared to prior art. Moreover, the tightness at high pressure, e.g. above 100 ato. is enhanced.

11 Claims, 3 Drawing Sheets

SHUT-OFF DEVICE OF THE DOUBLE BLOCK-AND-BLEED TYPE

BACKGROUND FOR THE INVENTION

1. Field of the Invention

The invention relates to a shut-off device of the double block-and-bleed type, where two shut-off members provided with a through-going cavity and a drain means are provided in association with the flow passageway, and where the flow passageway has an inlet and an outlet, said shut-off members each being movable between a position in which the flow passageway is open and a position in which the flow passageway is closed, two auxiliary chambers associated with the shut-off members communicating with the cavities of the shut-off members.

2. Background Art

Conventional double block-and-bleed valves comprise separate components which are bolted together to form a casing having a flow passageway accommodating the first and the second valve being interspaced and a drain valve being furthermore communicating therewith. These valves are of a comparatively long overall length which is not quite satisfactory. It is also known to provide a double-block-and-bleed valve with a shut-off member in form of valve balls. The drain means (the bleed) is a three-way valve. This double block-and-bleed valve is not sufficiently tight at high pressure, as it is necessary to use special sealing rings at the valve balls, which is not always effective.

SUMMARY OF THE INVENTION

The object of the invention is to provide a shut-off device of the above type having a shorter overall length than the known shut-off devices and which is more tight and more reliable and thus can withstand very high pressure, preferably above 100 atm.

In satisfaction of the above object there is provided by the present invention a shut-off device, wherein it comprises a single undivided casing and wherein the shutoff members are essentially truncated cone-shaped and mounted in matching essentially truncated cone-shaped recesses in the common casing, the auxiliary chambers forming part of these recesses. As a result, a double-block-and-bleed valve having a shorter overall length and being more tight is obtained, in particular as the shut-off members (the valve plugs) directly abut the casing (metal to metal). The sealing rings at the flow passageway are completely superfluous.

According to the invention, the auxiliary chambers may be defined by separate, almost non-resilient wall portions abutting abutment faces on the wall of the casing. A possible excess pressure occurring in the valve due to intense heating of said valve, e.g. as a result of a fire, may thus be easily relieved, the almost non-resilient wall portions yielding slightly and creating a connection to the atmosphere.

According to the invention there is provided an embodiment, wherein a pressure-relieving passageway is provided between the abutment face in a first auxiliary chamber of the first shut-off member and the inlet of the shut-off device, and/or a second pressure-relieving passageway is provided between the abutment face in a second auxiliary chamber and the outlet of the shut-off device. In practice, this renders a high fire resistance, as in case of fire the flow medium at the shut-off device never escapes the shut-off device and the tube into which the shut-off device is mounted.

Moreover, according to the invention the pressure-relieving passageways may be formed of a bore in the wall of the casing, whereby the pressure-relieving passageways are provided in a particularly simple manner, thus making the manufacture of the shut-off device more economical.

Furthermore, according to the invention, an actuator device may be provided in the common undivided casing to move the shut-off members. As a result, it is particularly easy to ensure that the two shut-off members adopt the correct position in connection with an opening and closing operation of the shut-off device.

According to the invention, the separate resilient wall portion may be formed as a bottom part bolted on the casing and one or more sealing means, preferably of steel or graphite, may be inserted between the bottom part and the abutment face. Consequently, under normal pressure and temperature conditions, the pressure-relieving passageway remains tightly closed.

The shut-off device according to the invention may advantageously be provided with a sealing ring of an essentially C-shaped cross section inserted into a circumferential groove associated with each abutment face. As a result a good sealing capacity at high pressure is obtained.

BRIEF DESCRIPTION OF THE DRAWINGS

The invention is explained in detail below with reference to the drawings, in which.

DETAILED DESCRIPTION OF PREFERRED EMBODIMENTS

Figure 1:
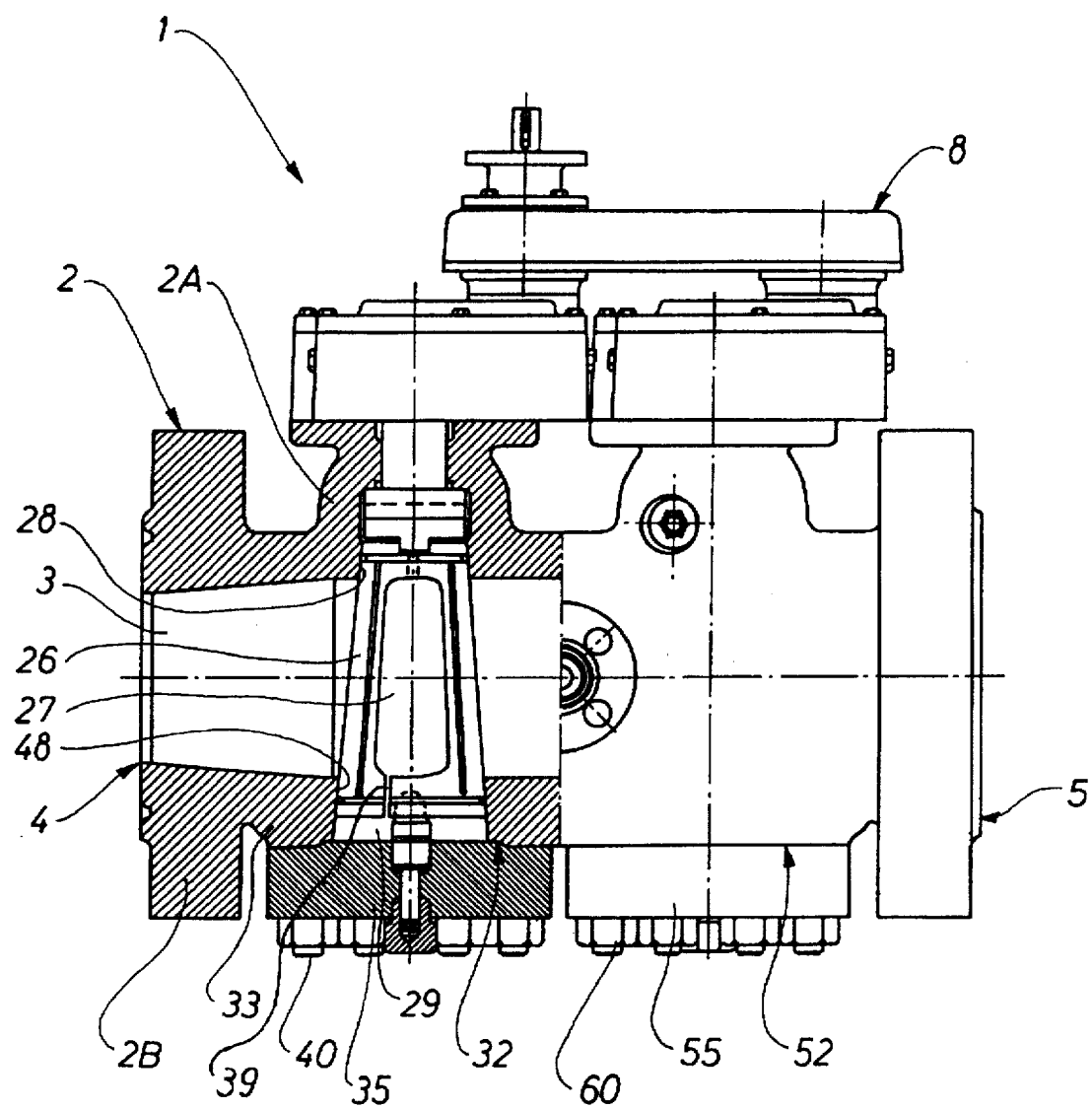
FIG. 1 is a side elevation view of an embodiment of the shut-off device according to the invention, partly in section along the line I—I in FIG. 2, the upper portion of the shut-off device including the actuator means and one of the shut-off members being shown in a non-sectional view.
Figure 2:
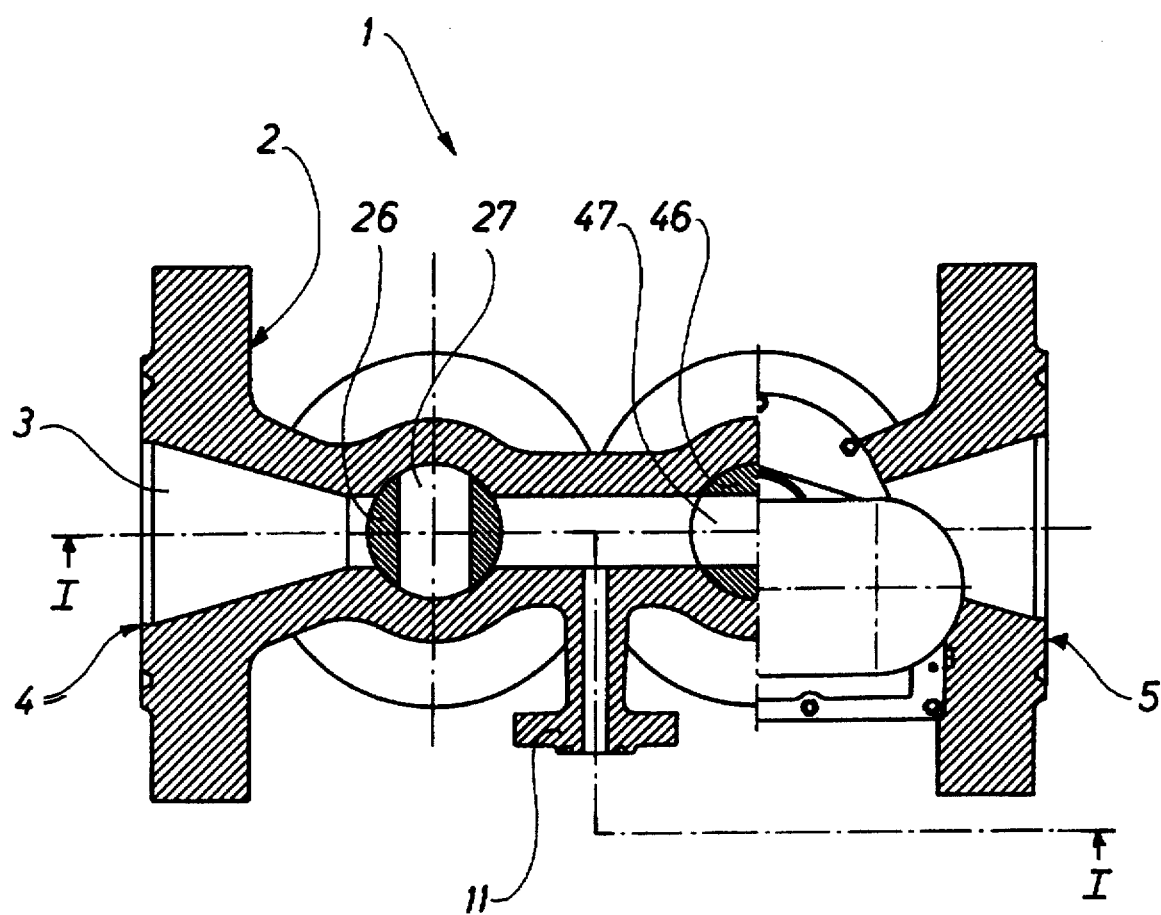
FIG. 2 the same shown in a top view, partly in section.

The shut-off device 1 shown in FIGS. 1 and 2, is of the double block-and-bleed type and comprises an undivided casing 2 provided with a flow passageway 3 extending in the entirety of the casing. The casing has an inlet 4, an intermediate part 25 and an outlet 5.

Two truncated cone-shaped recesses 48, 88 are formed in the lower part 2B of the casing 2, and two truncated cone-shaped recesses 28,68 are formed in the upper part of the casing. Two truncated cone-shaped shut-off members 26,46 are arranged in these recesses transversely of the flow direction. In the upper part 2A of the casing in register with the recesses 48,88 in the bottom part two truncated cone-shaped projections provided with bores are arranged to receive the uppermost and narrowest ends of the truncated cone-shaped shut-off members 26,46. Each of the two shut-off members 26, 46 has a through-going cavity 27,47 and can be moved between a position in which the flow passageway 3 is open and a position in which the flow passageway 3 is closed.

For closure of the two recesses 48,88 in the lower portion 2B of the casing two almost non-resilient wall portions 35, 55 in form of bottom covers are secured by means of bolts 40,60. The bottom covers abut each their own abutment face 32, 52 respectively, and serve to enable a possible excess pressure in the cavities 27,47 (e.g. occurring as a result of fire around the shut-off device) to be relieved (reduced).

An actuator device 8 is arranged on the casing and interconnected with the shut-off members for movement of these.

As shown in FIG. 2, a drain means 11 is provided on the side of the shut-off device essentially halfway between the two shut-off members. In the closing position of the shut-off members 26,46, the slight amount of medium which might escape past the first shut-off member 26 may be drained off through the drain means.

In the casing 2 below the first shut-off member 26, an auxiliary chamber 29 defined by the wall 33 of the casing, the bottom cover 35 and the shut-off member 26 is arranged and communicating with the cavity 27 of the shut-off member 26 through a passageway 39. Below the second shut-off member 46 a corresponding second auxiliary chamber 49 defined by the wall 33 of the casing, the bottom cover 55 and the shut-off member 46 is arranged and communicating with the cavity 47 of the second shut-off member 46 through a second passageway 59. A possible excess pressure in the cavities 27 and 47 as a result of fire may thus be relieved by the bottom cover 35 and 55 being lifted slightly of their abutment faces.

Figure 3:
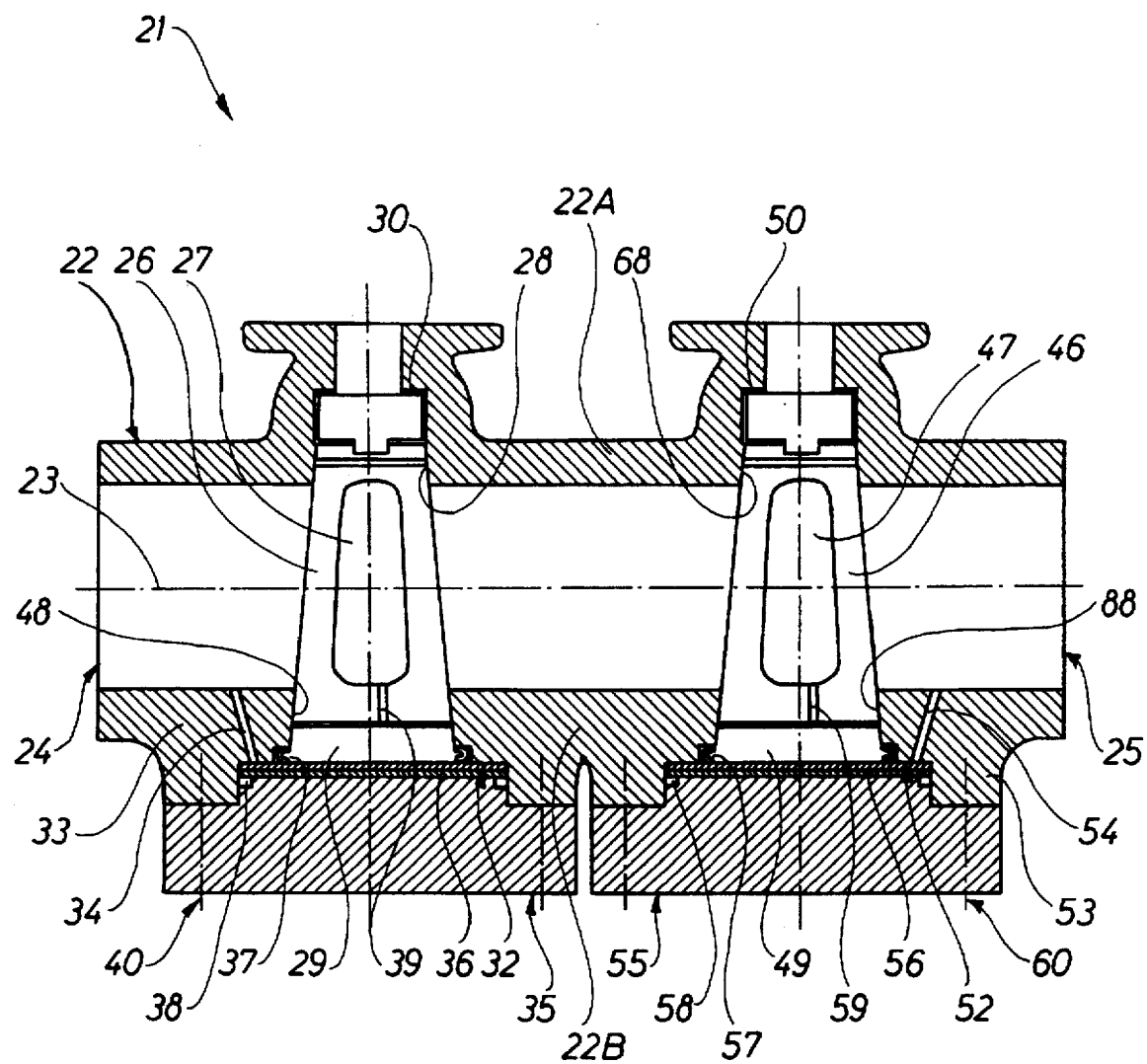
FIG. 3 illustrates a simplified embodiment of the shut-off device, the actuator means being removed and certain portions enlarged and where pressure-relieving passageways are provided; the entirety being seen in a longitudinal section (the shut-off members being shown in a non-sectional view).

The embodiment of the shut-off valve shown in FIG. 3 comprises an undivided casing 22 provided with a flow passageway 23. As shown in FIGS. 1 and 2, two truncated cone-shaped shut-off members 26,46 provided with transverse cavities 27,47 are arranged in said passageway. The two shut-off members abut the casing metal to metal and auxiliary chambers 29 and 59 respectively are arranged therebelow. These chambers are downwardly defined by the bottom covers 35 and 55 respectively.

A pressure-relieving passageway 34 may be provided at the first shut-off member 26 between the abutment face 32 and the inlet 24 of the shut-off device, and a second pressure-relieving passageway 54 may be provided at the second shut-off member 46 between the abutment face 52 and the outlet 25 of the shut-off device. In case an excess pressure occurs in the cavities 27, 29 or 47, 49, e.g. in connection with intense heating (fire), said excess pressure may be relieved through the passageways 34,54, (the bottom covers 35, 55 being slightly lifted off their abutment faces and passages between chamber 39 and the passageway 34 and between the chamber 49 and the passageway 54 being provided).

FIG. 3 illustrates furthermore that one or several sealing means, such as steel plates or graphite rings, can be inserted between the covers 35, 55 and the abutment faces 32, 52 and that a sealing ring 37,57 of an essentially C-shaped cross-section can be inserted in to a circumferential groove associated with the abutment face 32, 52.

Moreover, sealing rings 30, 50 can be arranged between the upper ends of the two shut-off members 26,46 and the casing 22.

The invention may be modified in many ways without thereby deviating from the scope of the invention.

We claim:

1. A shut-off device of the double block-and-bleed type, comprising first and second shut-off members provided with a through-going cavity and a drain means are provided in association with a flow passageway, the flow passageway having an inlet and an outlet, said shut-off members each being movable between a position in which the flow passageway is open and a position in which the flow passageway is closed, first and second auxiliary chambers respectively associated with the shut-off members, the auxiliary chambers being capable of communicating with the cavities of the shut-off members, the shut-off device further comprising a single undivided casing having first and second abutment faces, and the shut-off members being essentially truncated cone-shaped and respectively mounted in matching essentially truncated cone-shaped recesses in the casing, the auxiliary chambers forming part of these recesses.

2. A shut-off device according to claim 1 wherein the auxiliary chambers are respectively defined by first and second separate, substantially non-resilient wall portions respectively abutting said first and second abutment faces.

3. A shut-off device according to claim 1 wherein a first pressure-relieving passageway is provided between the first abutment face and the inlet.

4. A shut-off device according to claim 3 wherein the first pressure-relieving passageway is formed as a bore in the casing.

5. A shut-off device according to claim 2 wherein the separate, substantially non-resilient wall portions are formed as bottom parts bolted onto the casing and wherein at least one sealing means is arranged between the bottom parts and the abutment faces.

6. A shut-off device according to claim 2 wherein a sealing ring of an essentially C-shaped cross section is inserted into a circumferential groove associated with each abutment face.

7. A shut-off device according to claim 1 wherein a common actuator device is provided for movement of the shut-off members.

8. A shut-off device according to claim 3 wherein a second pressure-relieving passageway is provided between the second abutment face and the outlet.

9. A shut-off device according to claim 8 wherein the second pressure-relieving passageway is formed as a bore in the casing.

10. A shut-off device according to claim 5 wherein said sealing means is formed of steel.

11. A shut-off device according to claim 5 wherein said sealing means is formed of graphite.

* * * * *